United States Patent
Hveding et al.

(10) Patent No.: US 10,880,007 B1
(45) Date of Patent: Dec. 29, 2020

(54) SIMULTANEOUS DISTRIBUTED TEMPERATURE AND VIBRATION SENSING USING MULTIMODE OPTICAL FIBER

(71) Applicants: Saudi Arabian Oil Company, Dhahran (SA); King Abdullah University of Science and Technology, Thuwal (SA)

(72) Inventors: Frode Hveding, Hafrsfjord (NO); Islam Ashry, Thuwal (SA); Mao Yuan, Thuwal (SA); Boon Siew Ooi, Thuwal (SA); Muhammad Arsalan, Dhahran (SA)

(73) Assignees: Saudi Arabian Oil Company, Dhahran (SA); King Abdullah University of Science and Technology, Thuwal (SA)

( * ) Notice: Subject to any disclaimer, the term of this patent is extended or adjusted under 35 U.S.C. 154(b) by 0 days.

(21) Appl. No.: 16/541,998

(22) Filed: Aug. 15, 2019

(51) Int. Cl.
*G02B 6/00* (2006.01)
*H04B 10/2581* (2013.01)
*G01K 11/32* (2006.01)
*G02B 6/293* (2006.01)
*G01H 9/00* (2006.01)

(52) U.S. Cl.
CPC ......... *H04B 10/2581* (2013.01); *G01H 9/004* (2013.01); *G01K 11/32* (2013.01); *G02B 6/29361* (2013.01); *G01K 2011/324* (2013.01)

(58) Field of Classification Search
CPC .... G01K 11/32; G01K 2011/324; G02B 6/00; G02B 6/29361; G01H 9/004; H04B 10/2581
See application file for complete search history.

(56) References Cited

U.S. PATENT DOCUMENTS

| 5,708,500 | A | 1/1998 | Anderson |
| 5,892,860 | A | 4/1999 | Maron et al. |
| 7,668,411 | B2 | 2/2010 | Davies et al. |
| 9,581,489 | B2 | 2/2017 | Skinner |
| 9,599,505 | B2 | 3/2017 | Lagakos et al. |
| 9,880,096 | B2 * | 1/2018 | Bond ........................ H01S 5/10 |
| 10,209,383 | B2 | 2/2019 | Barfoot et al. |
| 2009/0304322 | A1 | 10/2009 | Davies et al. |
| 2015/0114127 | A1 | 4/2015 | Barfoot et al. |

(Continued)

FOREIGN PATENT DOCUMENTS

| CN | 102471701 | 5/2012 |
| CN | 107664541 | 6/2018 |
| WO | WO 2014/116458 | 7/2014 |

OTHER PUBLICATIONS

Bao et al., "Recent development in the distributed fiber optic acoustic and ultrasonic detection," Journal of Lightwave Technology vol. 35, No. 16, Aug. 15, 2017, 12 pages.

(Continued)

*Primary Examiner* — Jennifer Doan
(74) *Attorney, Agent, or Firm* — Fish & Richardson P.C.

(57) ABSTRACT

Methods, systems, and apparatuses for simultaneous distributed temperature and vibration sensing using a multimode optical fiber (MMF) is disclosed. The distributed temperature and vibration sensing may include a single mode optical fiber (SMF) coupled to an MMF via a connection in which a central axis of the SMF is aligned with a central axis of the MMF. The connections provides of excitation of the fundamental mode within the MMF by light passing from the SMF into the MMF through the connection.

17 Claims, 6 Drawing Sheets

(56) References Cited

U.S. PATENT DOCUMENTS

| | | | |
|---|---|---|---|
| 2015/0345803 A1* | 12/2015 | Nakao | F24F 5/0003 |
| | | | 165/218 |
| 2017/0038246 A1 | 2/2017 | Coates et al. | |
| 2017/0260846 A1 | 9/2017 | Jin et al. | |
| 2018/0045543 A1 | 2/2018 | Farhadiroushan et al. | |
| 2018/0052041 A1 | 2/2018 | Yaman et al. | |
| 2018/0202843 A1 | 7/2018 | Artuso et al. | |
| 2018/0284304 A1 | 10/2018 | Barfoot et al. | |

OTHER PUBLICATIONS

Chen et al., "Distributed acoustic sensor based on two-mode fiber," Optics Express, Sep. 2018, 9 pages.

Juarez and Taylor, "Field test of a distributed fiber-optic intrusion sensor system for long perimeters," Applied Optics vol. 46, No. 11, Apr. 10, 2007, 4 pages.

Keiser, "Optical fiber communications," p. 26-57, McGraw Hill, 2008, 16 pages.

Vysloukh, "Chapter 8: Stimulated Raman Scattering," p. 298-302, in Nonlinear Fiber Optics, 1990, 5 pages.

Wang et al., "Rayleigh scattering in few-mode optical fibers," Scientific reports, vol. 6, Oct. 2016, 8 pages.

Yamate et al., "Optical sensors for the exploration of oil and gas," Journal of Lightwave Technology vol. 35, No. 16, Aug. 15, 2017, 8 pages.

PCT International Search Report and Written Opinion in International Appln. No. PCT/US2020/020785, dated Jun. 18, 2020, 16 pages.

PCT International Search Report and Written Opinion in International Application No. PCT/US2020/046,300, dated Oct. 26, 2020, 24 pages.

* cited by examiner

FIG. 9

SIMULTANEOUS DISTRIBUTED TEMPERATURE AND VIBRATION SENSING USING MULTIMODE OPTICAL FIBER

TECHNICAL FIELD

This present disclosure relates to temperature and vibration sensing.

BACKGROUND

Optical fiber sensors possess numerous advantages, including immunity to electromagnetic interference, harsh environment operation, and miniature size. Distributed optical fiber sensors measure certain parameters, such as temperature or vibration, along a length of the fiber with specific spatial resolution. Distributed optical fiber sensors are used in a myriad of applications, such as oil and gas industry, real-time structural health monitoring, and aerospace transportation, among others.

SUMMARY

A first aspect of the present disclosure is directed to a sensor for simultaneous distributed sensing of vibration and temperature using a multimode optical fiber (MMF). The sensor may include a laser source operable to generate laser light, a modulator operable to generate optical pulses from the laser light, a single mode optical fiber (SMF) operable to transmits the optical pulses, an MMF extending from the SMF, a connection formed between the SMF and the MMF in which a central axis of the SMF is aligned with a central axis of the MMF such that optical pulses transmitted from the SMF to the MMF excite the fundamental mode within the MMF, a filter operable to separate a Rayleigh signal, a Stokes Raman signal, and an Anti-Stokes Raman signal from backscatter generated along a length of the MMF, a distributed temperature sensor (DTS) operable to detect distributed temperatures along the length of the MMF using the Stokes Raman signal and the Anti-Stokes Raman signal, and a distributed acoustic sensor (DAS) operable to detect distributed vibrations along the length of the MMF using the Rayleigh signal.

Another aspect of the present disclosure is directed to a computer-implemented method performed by one or more processors for simultaneous distributed temperature and vibration sensing using an MMF. The computer-implemented method may include generating optical pulses; introducing the optical pulses into SMF; transmitting the optical pulses from the SMF into an MMF through a connection between the SMF and MMF in which a central axis of the SMF is aligned with a central axis of the MMF such that that the fundamental mode is excited within the MMF; separating a Rayleigh signal, a Stokes Raman signal, and an Anti-Stokes Raman signal from backscatter produced by the optical pulses along a length of the MMF; obtaining temperature measurements along the length of the MMF using the Stokes Raman signal and the Anti-Stokes Raman signal; passing the separated Rayleigh signal from the MMF to the SMF through the connection between the SMF and the MMF such that the separated Rayleigh signal is in the fundamental mode within the SMF; and obtaining vibration measurements along the length of the MMF using the Rayleigh signal transmitted by the SMF.

Another aspect of the present disclosure is directed to an apparatus for simultaneous distributed temperature and vibration sensing using an MMF. The apparatus may include one or more processors and a non-transitory computer-readable storage medium coupled to the one or more processors and storing programming instructions for execution by the one or more processors. The programming instructions may include programming instructions to instruct the one or more processors to: generate optical pulses; introduce the optical pulses into an SMF; transmit the optical pulses from the SMF into an MMF through a connection between the SMF and MMF in which a central axis of the SMF is aligned with a central axis of the MMF such that that the fundamental mode is excited within the MMF; separate a Rayleigh signal, a Stokes Raman signal, and an Anti-Stokes Raman signal from backscatter produced by the optical pulses along a length of the MMF; obtain temperature measurements along the length of the MMF using the Stokes Raman signal and the Anti-Stokes Raman signal; pass the separated Rayleigh signal through the connection between the SMF and the MMF such that the separated Rayleigh signal is in the fundamental mode within the SMF; and obtain vibration measurements along the length of the MMF using the Rayleigh signal transmitted by the SMF.

The various aspects may include one or more of the following features. The connection may include a fusion splice. The connection may include a mating sleeve. The filter may be a wavelength-division-multiplexing (WDM) filter. The generated laser light may be a continuous wave laser light. The DAS may be coupled to the SMF, and the Rayleigh signal may be transmitted from the MMF to the SMF through the connection and to the DAS from the SMF. The DTS may include a first photodetector (PD) adapted to generate a first analog electrical signal from the Stokes Raman signal; a first analog-to-digital converter (ADC) adapted to generate a first digital signal from the first analog electrical signal; a second PD adapted to generate a second analog electrical signal from the Anti-Stokes Raman signal; a second ADC adapted to generate a second digital signal from the second analog electrical signal; and a DAS that determines temperature measurements sensed along the length of the MMF using the first digital signal and the second digital signal. The DAS may include: a PD adapted to generate an analog electrical signal from the Rayleigh signal; an ADC adapted to generate a digital signal from the analog electrical signal; and a digital signal processor (DSP) that determines vibration measurements sensed along the length of the MMF using the digital signal.

The various aspects also may include one or more of the following features. Generating optical pulses may include generating continuous wave laser light and modulating the continuous wave laser light to form the optical pulses. The connection may include a fusion splice. The connection may include a mating sleeve. Obtaining temperature measurements along the length of the MMF using the Stokes Raman signal and an Anti-Stokes Raman signal may include utilizing a DTS to obtain temperature measurements along the length of the MMF using the Stokes Raman signal and the Anti-Stokes Raman signal. Obtaining vibration measurements along the length of the MMF using the Rayleigh signal transmitted by the SMF may include utilizing a DAS to obtain vibration measurement along the length of the MMF using the Rayleigh signal transmitted by the SMF.

The various aspects also may include one or more of the following features. The programming instructions to instruct the one or more processor to generate optical pulses may include programming instruction to instruct the one or more processors to: generate continuous wave laser light and modulate the continuous wave laser light to form the optical pulses. The programming instructions to instruct the one or more processor to obtain temperature measurements along the length of the MMF using the Stokes Raman signal and the Anti-Stokes Raman signal may include programming instructions to instruct the one or more processors to utilize a DTS to obtain temperature measurements along the length of the MMF using the Stokes Raman signal and the Anti-Stokes Raman signal. The programming instructions to instruct the one or more processor to obtain vibration measurements along the length of the MMF using the Rayleigh signal transmitted by the SMF may include programming instructions to instruct the one or more processors to utilizing a DAS to obtain vibration measurement along the length of the MMF using the Rayleigh signal transmitted by the SMF.

The details of one or more implementations of the present disclosure are set forth in the accompanying drawings and the description to follow. Other features, objects, and advantages of the present disclosure will be apparent from the description and drawings, and from the claims.

DETAILED DESCRIPTION

For the purposes of promoting an understanding of the principles of the present disclosure, reference will now be made to the implementations illustrated in the drawings, and specific language will be used to describe the same. Nevertheless, no limitation of the scope of the disclosure is intended. Any alterations and further modifications to the described devices, systems, methods, and any further application of the principles of the present disclosure are fully contemplated as would normally occur to one skilled in the art to which the disclosure relates. In particular, it is fully contemplated that the features, components, steps, or a combination of these described with respect to one implementation may be combined with the features, components, steps, or a combination of these described with respect to other implementations of the present disclosure.

Optical fiber distributed temperature sensors (DTSs) and distributed acoustic sensors (DASs) are useful in many industries, including the oil and gas industry. Since DTSs and DASs have different operation principles, various kinds of optical fibers may be used for these sensing systems. In particular, multimode optical fibers (MMFs) and single mode optical fibers (SMFs) are used for DTS and DAS, respectively. MMFs have widespread use because of the reduced cost associated with MMFs. SMFs, on the contrary, have an increased cost relative to MMFs.

DTS and DAS have different operating principles and system requirements. In particular, a DTS relies on Raman scattering in optical fibers. Since Raman signals are typically weak signals (having power levels that are approximately 60 decibels (dB) less than an input power level), an input signal having an increased peak power is injected into an optical fiber in order to produce Raman signals having a satisfactory signal-to-noise ratio (SNR). As a result, a multimode fiber (MMF) is preferred for use in a DTS, because a typical MMF has a greater effective area compared to a single mode fiber (SMF) and an increased threshold of nonlinearity compared to an SMF. This greater effective area and increased threshold of nonlinearity of an MMF support signals having increased peak power without degradation.

On the other hand, a DAS uses Rayleigh scattering in optical fibers. Compared with Raman signals, Rayleigh signals are considerably stronger and use less power when introduced into an optical fiber. Consequently, both SMFs and MMFs are less than the nonlinearity threshold in the context of Rayleigh scattering, and, as a result, both SMFs and MMFs are usable for a DAS. However, because DAS functionality is affected by interference of backscattered Rayleigh signals, an MMF produces considerable noise in DAS systems. The noise is produced because a typical MMF supports propagation of a greater number of modes compared to an SMF, and each mode has a distinct interference signature which produces Rayleigh signals that are independent of vibration. As a result, MMFs and SMFs are used for DTS and DAS, respectively.

Because of these differences, DAS includes an SMF, and a DTS includes an MMF. With the use of different fiber types, a desire to include both a DAS and a DTS involves increased costs due to the cost of installation of two different types of fibers as well as the increased cost of an SMF compared to an MMF.

In the present disclosure, a sensor that provides simultaneous temperature and vibration monitoring using an MMF is provided. Such sensors are operable to separate Raman and Rayleigh signals in the wavelength domain for the purpose of temperature and vibration sensing, respectively. Vibration sensing is accomplished by exciting a single mode (that is, the fundamental mode) in the MMF so that the MMF behaves as an SMF. As a result, sensors of the type described in the present disclosure utilize an MMF that satisfies the operating principles of both a DTS and a DAS, which significantly reduces the overall implementation costs compared to conventional approaches that use a separate DAS and DTS having different optical fiber types.

Applications for sensors within the scope of the present disclosure include temperature and vibration monitoring of pipelines. In some implementations, the MMF of a distributed sensor as described in the present disclosure extends along a length of a pipeline. For example, in some implementations, the MMF may extend along the pipeline in a linear fashion. In other implementations, the MMF may extend helically along the pipeline. The MMF may be clamped to the pipeline at one or more locations along the length of the pipeline. Other arrangements of the MMF along a pipeline are also within the scope of the present disclosure. In still other implementations, an MMF of a sensor of the present disclosure may be positioned internally within a pipeline or wellbore. For example, in some implementations, the MMF may be positioned within a casing of a wellbore via a wireline, carbon rod, or a coiled tubing.

MMFs are used more widely than SMFs, because MMFs are less sensitive to misalignment and are less expensive. Consequently, optical systems that use MMFs are easier to construct and have a reduced cost compared to a similar system that uses SMFs. Therefore, MMFs are more commonly used than SMFs, especially for applications involving a span less than or equal to 10 kilometers (km). For example, numerous MMFs are already installed worldwide in oil and gas wells for a variety of purposes, including in the context of DTSs. Therefore, the ability to utilize these existing DTS for simultaneous vibration and temperature would provide a more cost-effective approach as compared to installing new SMFs for vibration sensing. However, in light of the challenges described earlier with respect to SMFs, utilizing an MMF, whether already installed in an application or not, is problematic.

Systems, methods, and apparatuses described in the present disclosure utilize an MMF for simultaneous vibration and temperature sensing. Raman and Rayleigh signals, used respectively for DTS and DAS, are separated in the wavelength domain with the use of multiplexing and demultiplexing to perform wavelength division. Light, such as laser light, is injected into an MMF in a manner so as to excite the fundamental mode. In this way, the MMF performs as an SMF. As a result, the MMF is usable to form a combined distributed temperature and acoustic sensor that is operable to measure temperature and vibration simultaneous. In some implementations, the laser light injected into the MMF excites the fundamental mode within the MMF. In some instances, the laser light only excites the fundamental mode with the MMF.

The systems, methods, and apparatus described in the present disclosure are operable to simultaneously identify locations along the MMF subjected to vibrations, measure the frequencies of these vibrations, and monitor temperature at locations along the MMF. Associated advantages include simultaneous and continuous monitoring for temperature and vibration along an MMF and cost-effectiveness, since a single sensor replaces two separate sensors. Further, a reduction in sensor installation time, effort, and cost associated with is a single distributed temperature and acoustic sensor are realized.

Figure 1:
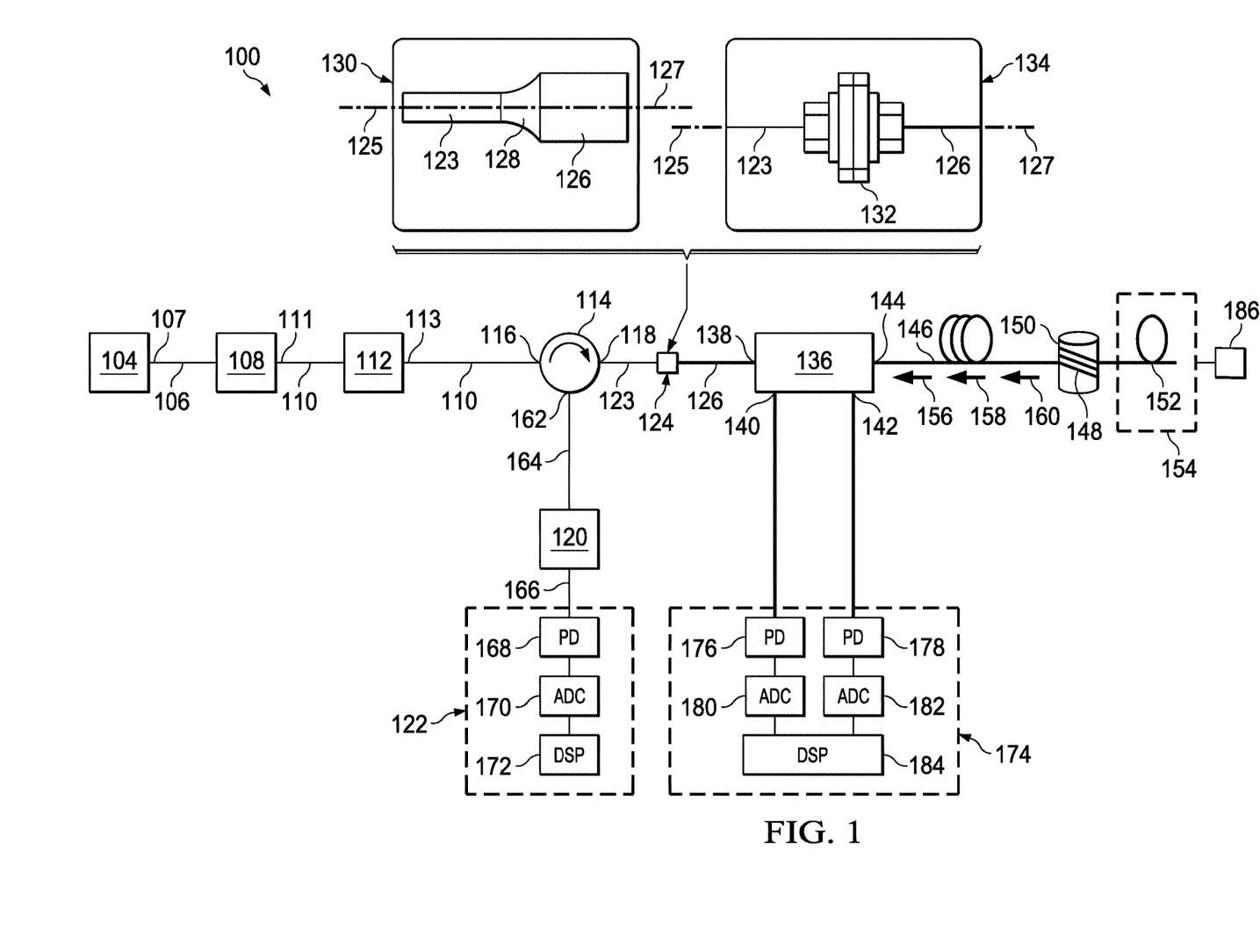
FIG. 1 is a schematic of an example hybrid DTS-DAS system, according to some implementations of the present disclosure.

FIG. 1 is a schematic of a hybrid DTS-DAS system 100 that uses an MMF. The system 100 includes a laser source 104. In some implementations, the laser source may be a narrow linewidth laser. The laser source 104 produces laser light in the form of a continuous wave laser light 106. In some implementations, the produced laser light 106 may have a wavelength within a range of 850 nanometers (nm) to 1550 nanometers. In particular implementations, a wavelength of the produced laser light may be approximately 850 nm, 1300 nm, or 1550 nm. However, these wavelengths are provided merely as examples and are not intended to limit the scope of the disclosure. Consequently in other implementations, the laser light may have a wavelength other than those described. For example, the wavelength of laser light includes wavelengths within a first, second, or third optical window of an optical fiber. Wavelengths of laser light other than those encompassed by the first, second, or third optical windows may be used but may result in a decreased sensing range.

As explained earlier, the laser source 104 produces laser light 106 in the form of a continuous wave laser. The laser light 106 travels along an SMF 107 that connects the laser source 104 and a modulator 108. The modulator 108 receives the continuous wave laser light 106, and the modulator 108 modulates the laser light 106 into time domain optical pulses 110. The optical pulses 110 may have any desired pulse width or delay between optical pulses. For example, in some implementations, a pulse width may be within a range of 10 nanoseconds (ns) to 100 ns, which provides a spatial resolution within a range of 1 meter (m) to 10 m. However, as described earlier, the scope of the disclosure encompasses other pulse widths. Consequently, the scope of the disclosure is not limited to the particular example pulse widths described. Additionally, the delay between optical pulses may be within a range of, for instance, 10 microseconds (µs) to 1 milliseconds (ms). However, the scope of the disclosure also includes other pulse delay times. The optical pulses 110 leave the modulator 108 via an SMF 111.

In some implementations, an amplifier 112 is included and is coupled to the modulator 108 via the SMF 111. In such implementations, the amplifier 112 receives the optical pulses 110 where the optical pluses 110 are amplified and exit from the amplifier via an SMF 113. However, in other implementations, the amplifier 112 may be omitted. The optical pulses 110, whether amplified or unamplified, are directed to a circulator 114. The optical pluses 110 enter the circulator 114 via port 116 and exit the circulator 114 at port 118, thereby bypassing amplifier 120 and DAS 122. Upon leaving the circulator 114 via port 118, the optical pulses 110 travel along an SMF 123, where the optical pulses 110 encounter a connection 124. Because SMFs join the laser source 104, modulator 108, circulator 114, and, optionally, the amplifier 112 to the connection 124, the laser light, whether in continuous form or in pulse form, is maintained in the fundamental mode within the SMF.

The connection 124 is a location where SMF 123 connects to an MMF 126. In some implementations, the SMF 123 and the MMF 126 may be connected via a fusion splice 128, as shown at 130. In other implementations, the SMF 123 and the MMF 126 may be connected via a mating sleeve 132, as shown at 134. The fusion splice 128 and the mating sleeve 132 align a central axis 125 of the SMF 123 with a central axis 127 of the MMF 126 to provide alignment between the SMF 123 and the MMF 126 such that the laser light traveling through the SMF 123 in the fundamental mode enters into the MMF 126 and remains in the fundamental mode within the MMF 126, to the exclusion of other modes. When an MMF transmits light only within the fundamental mode, the MMF is described as operating in a quasi-single-mode (QSM) state. While a fusion splice and a mating sleeve are provided as examples of joining and aligning an SMF and an MMF, other joining methods operable to align the central axis of the SMF and MMF are within the scope of the present disclosure.

The optical pulses 110 traveling through MMF 126 in the fundamental mode are received by a wavelength-division-multiplexing (WDM) filter 136. The WDM filter 136 includes a Rayleigh scattering input port 138 through which the optical pulses 110 enter the WDM filter 136. Since Rayleigh scattering is an elastic phenomenon which means that Rayleigh scattering occurs at the same wavelength as the incoming or pump signal (that is, the laser light produced by the laser source 104 and as amplified by the amplifier 112, where applicable), the optical pulses 110 are injected into the WDM filter 136 through the Rayleigh scattering input port 138. The WDM filter 136 also includes a Stokes Raman signal port 140, an Anti-Stokes Raman signal port 142, and a common output port 144.

An MMF 146 couples to and extends from the common output port 144. In the illustrated example of FIG. 1, a length 148 of the MMF 146 wraps around an item 150 that vibrates to provide a vibration input to the MMF 146 along the length 148 of the MMF 146. The item 150 is made to vibrate at selected frequencies. In some implementations, the item 150 may be a piezoelectric cylinder. In other implementations, the item 150 may be another type of device that can be made to vibrate. The system 100 is operable to detect a vibration along the length 148 of the MMF 146 along with detecting a particular frequency of the vibration. An end 152 of the MMF 146 is disposed in a fluid bath 154. Thus, the system 100 is operable to detect a temperature of the fluid bath 154 and any change in the temperature of the fluid bath 154 using the end 152 of the MMF 146.

However, the scope of the present disclosure is not so limited. While the system 100 can detect a temperature and change in temperature at the end 152 associated with the fluid bath 154 and detect a vibration and frequency of vibration along the length 148 of the MMF 146, the system 100 is also operable to detect temperature and vibration along the other portions of the MMF 146. Thus, simultaneous detection of vibration and temperature by an MMF within the scope of the present disclosure is not limited to distinct locations along the MMF. Rather, the systems, methods, and apparatuses described in the present application provide for obtaining distributed vibration and temperature measurements along an entire length of the MMF fiber. Thus, while FIG. 1 shows an example in which item 150 is used to provide a vibration input to the length 148 of the MMF 146 and the fluid bath 154 is used to provide a temperature input into end 152 of the MMF 146, the length 148 is also capable of simultaneously detecting temperature inputs and the end 152 is simultaneously capable of detecting vibration inputs. Moreover, the remaining length of the MMF is also operable to receive and detect both vibration and temperature inputs. Consequently, the item 150 and fluid bath 154 are provided merely as example inputs to illustrate the capabilities and operation of the present disclosure.

As the optical pulses 110 travel through the MMF 146, backscattering of the optical pulses 110 occurs to produce a Rayleigh signal 156, a Stokes Raman signal 158, and Anti-Stokes Raman signal 160, as shown in FIG. 1. Because these signals 156, 158, and 160 have different wavelengths, each of the signals 156, 158, and 160 are received into the WDM filter 136 via the common output port 144 and are separated by the WDM filter 136, such that Rayleigh signal 156 is used for vibration sensing, and Stokes Raman signal 158 and Anti-Stokes Raman signal 160 are used for temperature sensing. In some implementations, the WDM 136 transmits and separates Stokes Raman signals and Anti-Stokes Raman having frequencies within a range from −10 terahertz (THz) to 10 THz. Further, the WDM 136 removes other signals from the Stokes Raman signal 158 and the Anti-Stokes Raman 160. Thus, WDM 136, separates the Rayleigh signal 156 from the Stokes Raman signal 158 and the Anti-Stokes Raman 160 and transmits the Rayleigh signal 156 out of the WDM 136.

The filtered Rayleigh signal 156 exits the WDM filter 136 via the Rayleigh scattering input port 138 and passes through the MMF 126 and the connection 124. In passing into the SMF 123 from the MMF 126, the SMF 123 operates as a spatial filter and permits transmittal of only the fundamental mode of the Rayleigh signal 156. Thus, as a result of the aligned axes of the SMF 123 and the MMF 126, the SMF 123 operates to select only the fundamental mode of the Rayleigh signal 156 within the MMF 126 when the Rayleigh signal 156 is transmitted from the MMF 126 to the SMF 113. Additionally, coupling of the SMF 113 and the MMF 126 as described earlier reduces noise from the MMF 126 that would otherwise be introduced into the DAS 122.

The filtered Rayleigh signal 156 is introduced into the circulator 114 via the port 118. The filtered Rayleigh signal 156 exits the circulator 114 via a port 162 and travels through an SMF 164 where the filtered Rayleigh signal 156 is amplified by amplifier 120 and enters the DAS 122, via SMF 166. In some implementations, the amplifier 120 is optional and may be omitted. Inclusion of the amplifier 120 may depend, for example, on a power level of the filtered Rayleigh signal 156.

The filtered Rayleigh signal 156, whether in an amplified or non-amplified condition, enters the DAS 122. Using the filtered Rayleigh signal 156, the DAS 122 determines the locations along the MMF 146 where vibrates are present along with the frequencies of those vibrations. Particularly, the DAS 122 includes a photodetector (PD) 168, an analog-to-digital converter (ADC) 170, and a digital signal processor (DSP) 172. The PD 168 converts the filtered Rayleigh signal 156 into an analog electrical signal. The electrical signal is transmitted to the DAS 122. The DAS 122 samples the analog electrical signal produced by the PD 168. In some implementations, the DAS 122 may sample the analog electrical signal at a rate of at least twice the bandwidth of the pulsations generated by the modulator 108. The scope of the disclosure is not so limited, however, and other sampling rates may be used.

The DSP 172 performs digital signal processing on the digital signal produced by the DAS 122. In some implementations, the DSP 172 initially operates to determine locations along the MMF where vibrations are being sensed. To determine the locations of vibration along the MMF, the DSP 172 subtracts Rayleigh traces in the time domain. With the locations where vibrations are being sensed along the MMF determined, the DSP 172 performs a Fourier transform on the digital signal associated with the locations where vibrations have been determined to be present in order to determine the frequencies of the vibrations at those locations.

Figure 2:
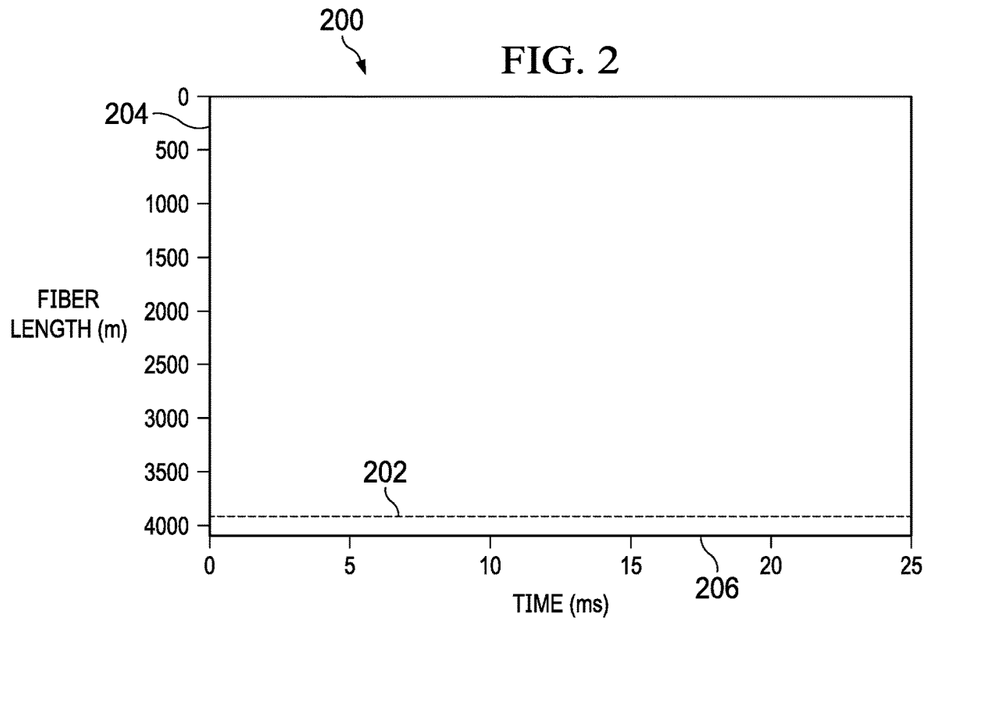
FIG. 2 is a plot showing a sensed vibration along a length of a multimode optical fiber (MMF), according to some implementations of the present disclosure.
Figure 3:
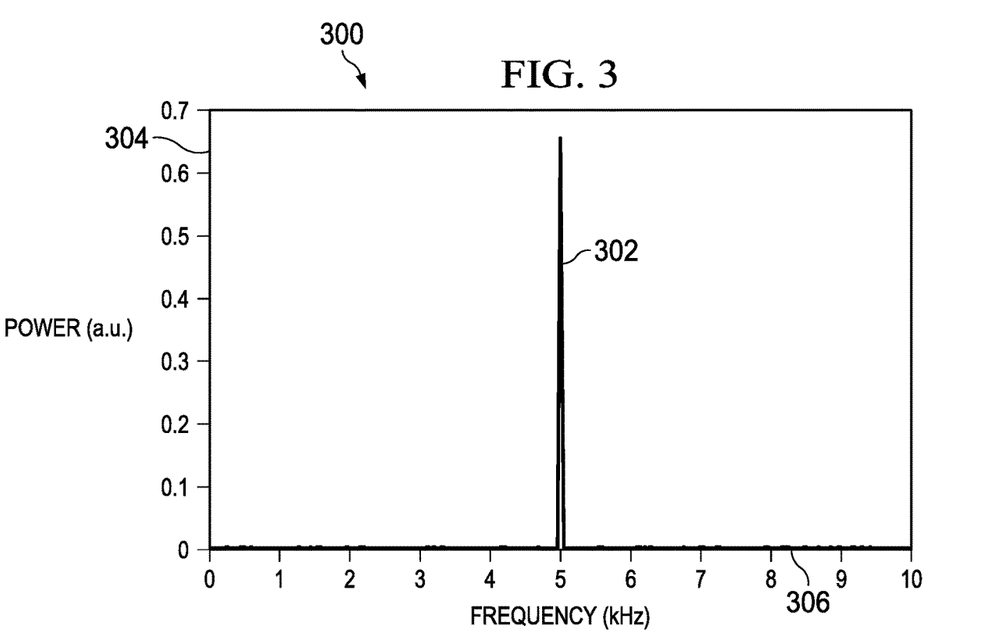
FIG. 3 is a plot showing a frequency of the sensed vibration shown in FIG. 2.

FIGS. 2-5 show example output plots obtained from the DAS 122 of FIG. 1. In the context of FIGS. 2 and 3, the item 150 is located at a position of 3900 m along the length of the MMF 146, as shown in FIG. 1. In the experimental setup shown in FIG. 1, the item 150 is a piezoelectric cylinder, and the piezoelectric cylinder is operable to vibrate at a selected frequency. The item 150 is made to vibrate at a frequency of five hertz. As shown in the plot 200 of FIG. 2, the DAS 122 correctly identifies a vibration occurring at the position of 3900 m along the MMF 146, as shown at 202. The y-axis 204 represents a length along the MMF 146 of FIG. 1, and the x-axis 206 represents a time, in milliseconds (ms), over which a vibration is sensed by the MMF 146. Additionally, the DAS 122 correctly determines that the vibration at this position has a frequency of five hertz, as shown in the plot 300 of FIG. 3 at 302. The plot 300 of FIG. 3 includes a y-axis 304 that represents a power of the detected vibration in an arbitrary unit (a. u.), and the x-axis 306 represents the frequency of the detected vibration in kilohertz (kHz).

Figure 4:
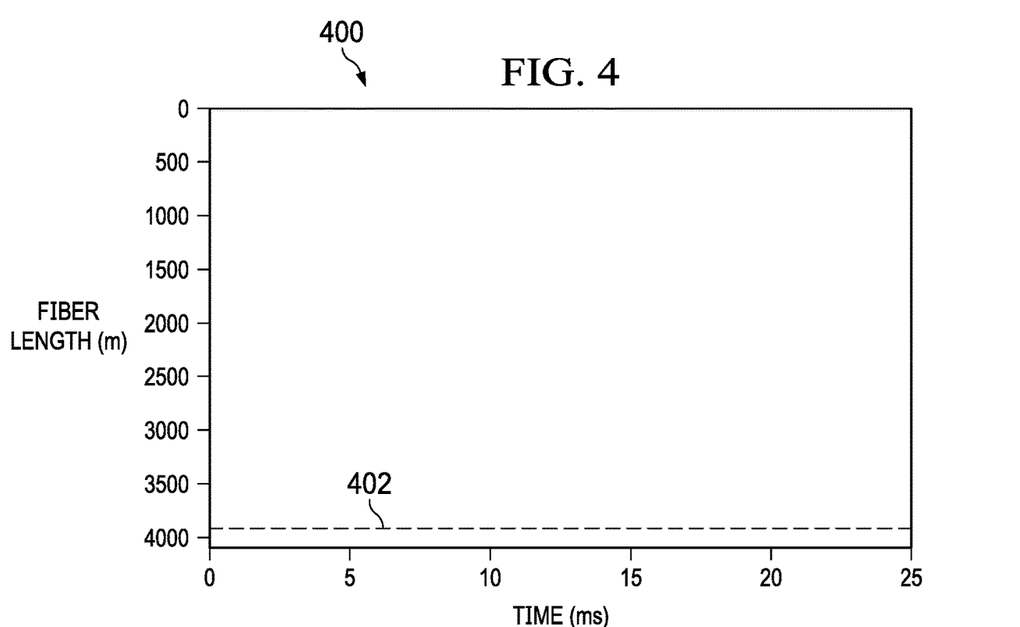
FIG. 4 is a plot showing a sensed vibration along a length of an MMF, according to some implementations of the present disclosure.
Figure 5:
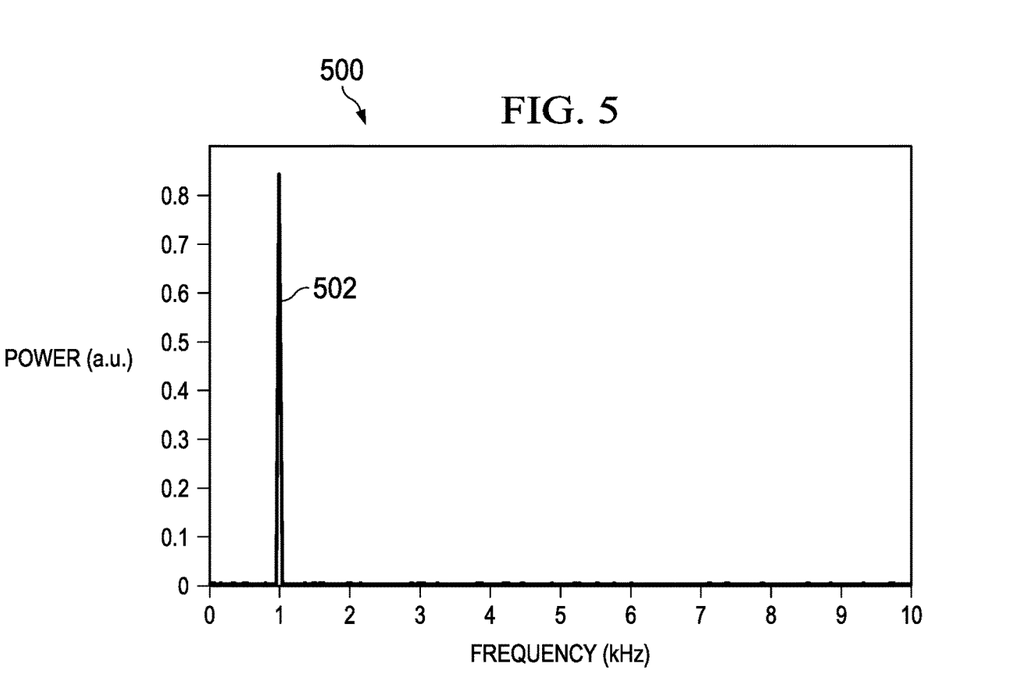
FIG. 5 is a plot showing a frequency of the sensed vibration shown in FIG. 4.

In another experiment, the location of the item 150 remains unchanged, but a vibration frequency of the item 150 is changed. The item 150 is made to vibrate at a frequency of one hertz. The plot 400 of FIG. 4 shows that the DAS 122 correctly determined the position of the vibration along the length of the MMF 146. As shown in FIG. 4, the location along the MMF 146 is determined to be at the 3900 m position, as indicated at 402. The plot 500 of FIG. 5 shows that the DAS 122 also correctly determined the frequency of vibration of the item 150 to be one hertz, as indicated at 502.

Temperature determination by the system 100 is now described. Returning to FIG. 1, the Stokes Raman signal 158 and Anti-Stokes Raman signal 160 are received by the WDM filter 136 and are filtered and separated by the WDM filter 136. The filtered Stokes Raman signal 158 and the filtered Anti-Stokes Raman signal 160 leave the WDM filter 136 via the Stokes Raman signal port 140 and the Anti-Stokes Raman signal port 142, respectively. A DTS 174 receives the filtered Stokes Raman signal 158 and the filtered Anti-Stokes Raman signal 160, which are directed onto PDs 176 and 178, respectively. The DTS 174 determines temperature at positions along the MMF 146 using the filtered Stokes Raman signal 158 and the filtered Anti-Stokes Raman signal 160 according to known principles. Similar to the PD 168 described earlier, the PDs 176 and 178 convert the filtered Stokes Raman signal 158 and the filtered Anti-Stokes Raman signal 160 into respective analog electrical signals. The analog electrical signals are received by respective ADCs 180 and 182. Similar to the ADC 170 described earlier, the ADCs 180 and 182 sample the analog electrical signals produced by the PDs 176 and 178, respectively. In some implementations, the sampling rates used by the ADCs 180 and 182 are at least twice the bandwidth of the filtered Stokes Raman and the filtered Anti-Stokes Raman signals 158, 160. The scope of the disclosure is not so limited, however, and other sampling rates may be used.

A DSP 184 receives the digital signals produced by the ADCs 180 and 182. In some implementations, the DSP 184 initially operates to calibrate a temperature-sensing function of the system 100 by generating a calibration curve between a ratio of the Anti-Stokes Raman signal 160 and the Stokes Raman signal 158 received by the DTS 174 and an associated reference temperature measurement. For example, in the context of FIG. 1, a thermistor 186 in contact with the fluid bath 154 measures a temperature of the fluid bath 154. These measured temperatures, along with a ratio of the Anti-Stokes Raman signal to the Stokes Raman signal, provide reference temperature measurements associated with the fluid bath 154. This calibration process may be performed using a single reference temperature measurement. Thereafter, with the correlation completed, the DTS 174 is operable to detect temperatures at locations along the MMF 146. With the calibration curve generated, the DSP 184 continues to produce a ratio between the received Anti-Stokes Raman signal 160 and the Stokes Raman signal 158 to continuously determine temperature at locations along the MMF 146.

Figure 6:
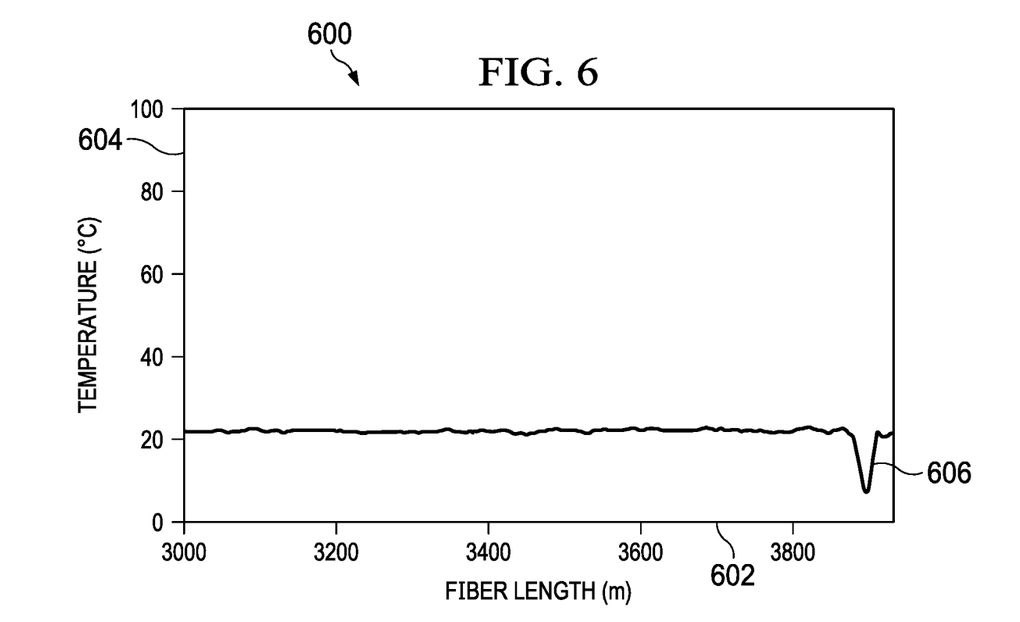
FIG. 6 is a plot showing temperatures sensed along a length of an MMF, according to some implementations of the present disclosure.

FIG. 6 is a plot 600 that displays temperature measurements along the MMF 146 of FIG. 1. The x-axis 602 represents the length of the MMF 146 in meters, and the y-axis 604 represents temperature in degrees Celsius (° C.). The plot 600 shows the temperatures detected by the MMF 146 along an entire length of the MMF 146. As shown at 606, a portion of the MMF 146 near the 3900 meter position experiences a temperature that is less than the remainder of the MMF 146. The 3900 meter position corresponds to the end 152 of the MMF 146, as shown in FIG. 1.

Figure 7:
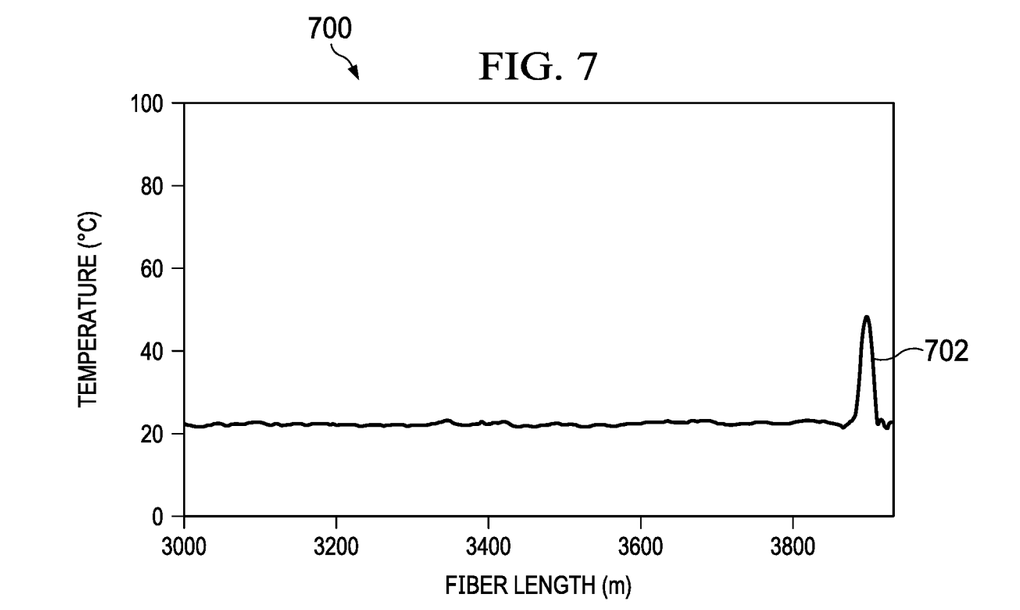
FIG. 7 is another plot showing temperatures sensed along a length of an MMF, according to some implementations of the present disclosure.

In an example, the fluid bath 154 of FIG. 1 is cooled to a temperature of approximately 7.5° C. The plot 600 of FIG. 6 shows that the temperature at the 3900 meter position is approximately 7.5° C. while the remainder of the MMF 146 measures a largely uniform temperature of approximately 22° C. along the remainder of the MMF 146. The 7.5° C. temperature measurement reflects the temperature of the fluid bath 154, and this measured temperature along the remainder of the MMF 146 is the ambient temperature. In another example, the fluid bath 154 is heated to a temperature of approximately 48° C., and, at 702, plot 700 of FIG. 7 shows the temperature at the 3900 meter location on the MMF 146 to be approximately 48° C. The remainder of the MMF 146 shows the ambient temperature of approximately 22° C. Further, the temperatures measured by the MMF 146, particularly at the locations in contact with the fluid bath 154, align with separate reference measurements of the fluid bath 154.

Therefore, the systems, methods, and apparatuses within the scope of the present disclosure are operable to detect and measure vibrations and temperatures along a length of an MMF, including an entire length of an MMF, simultaneously. Thus, the present disclosure provides for distributed vibration and temperature sensing using an MMF operating in the QSM state in the form of hybrid DAS and DTS sensor.

Figure 8:
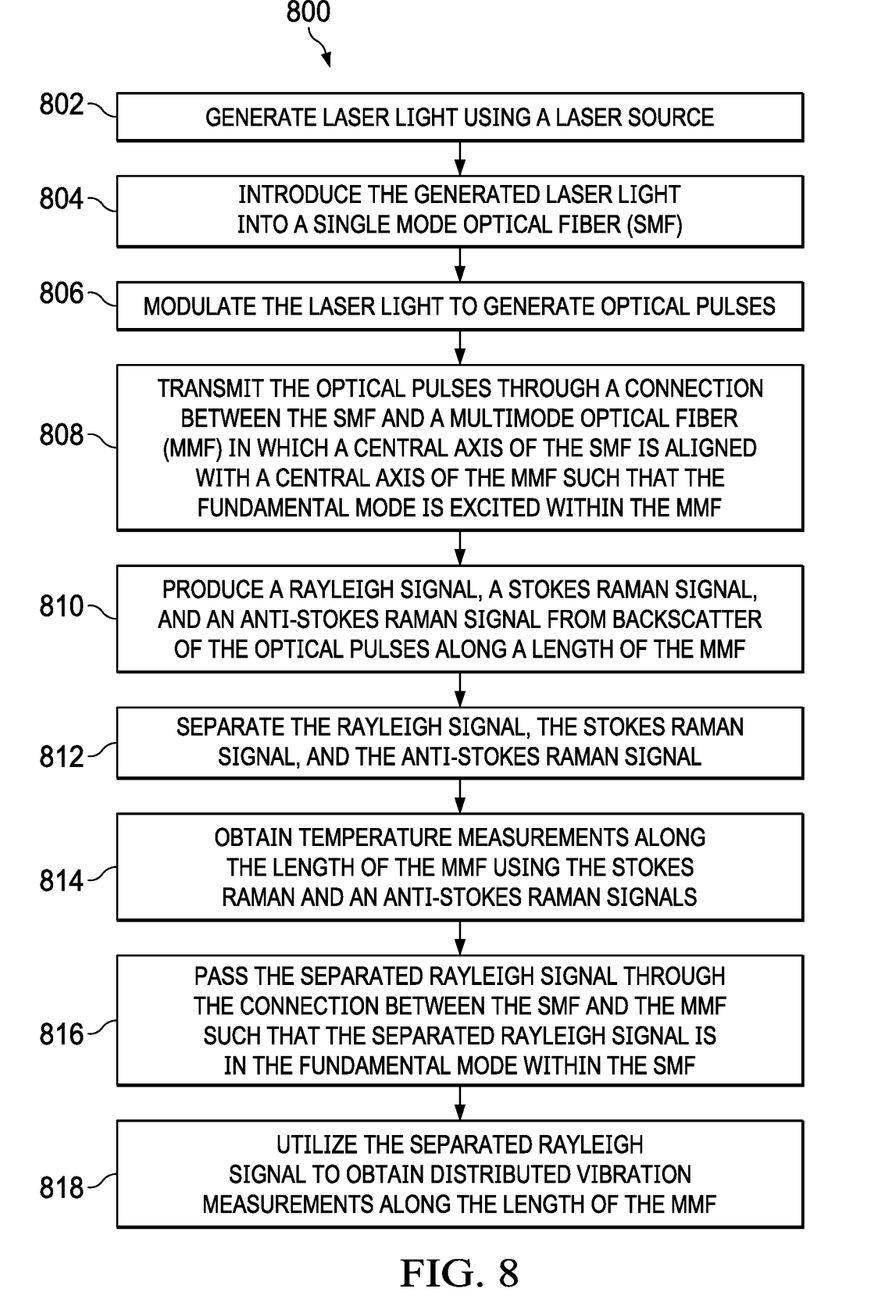
FIG. 8 is a flowchart of an example method of simultaneous distributed sensing of vibration and temperature along a length of an MMF, according to some implementations of the present disclosure.

FIG. 8 is a flowchart of an example method 800 for performing distributed, simultaneous temperature and measurement sensing. At 802, a laser source generates laser light. In some implementations, the laser light is in a continuous laser light. At 804, the laser light is introduced into and transmitted along an SMF. At 806, the laser light is modulated to generate optical pulses of laser light. In some implementations, the optical pulses may have a pulse width in a range of 10 ns to 100 ns, which provides a spatial resolution within a range of 1 m to 10 m. At 808, the optical pulses are transmitted through a connection between the SMF and an MMF in which a central axis of the SMF is aligned with a central axis of the MMF such that the fundamental mode is excited within the MMF. In some implementations, the optical pulses only excite the fundamental mode of the MMF upon passing through the connection. At 810, the optical pulses are backscattered along a length of the MMF to produce a Rayleigh signal, a Stokes Raman signal, and an Anti-Stokes Raman signal. At 812, the Rayleigh, a Stokes Raman, and an Anti-Stokes Raman signals are separated. In some implementations, the Rayleigh, a Stokes Raman, and an Anti-Stokes Raman signals are separated by a WDM filter. At 814, temperature measurements along the length of the MMF are obtained using the Stokes Raman, and an Anti-Stokes Raman signals. The temperature measurements that use the Stokes Raman, and an Anti-Stokes Raman signals may be determined according to known principles. In some implementations, the distributed temperature measurements are generated using a DTS. The DTS may include a PD and an ADC for each of the Stokes Raman signal and the Anti-Stokes Raman signal. The DTS may also include a DSP that computes the distributed temperatures based on output of the DSPs. In some implementations, the DTS may be similar to the DTS 174 described earlier.

At 816, the separated Rayleigh signal is passed through the connection between the SMF and the MMF, resulting in the separated Rayleigh signal being in the fundamental mode within the SMF. At 818, the separated Rayleigh signal is utilized to determine distributed vibration measurements along the length of the MMF. In some implementations, the distributed vibration measurements may be determined using a DAS. The DAS may include a PD, an ADC, and a DSP. In some implementations, the DAS may be similar to the DAS 122 described earlier.

Figure 9:
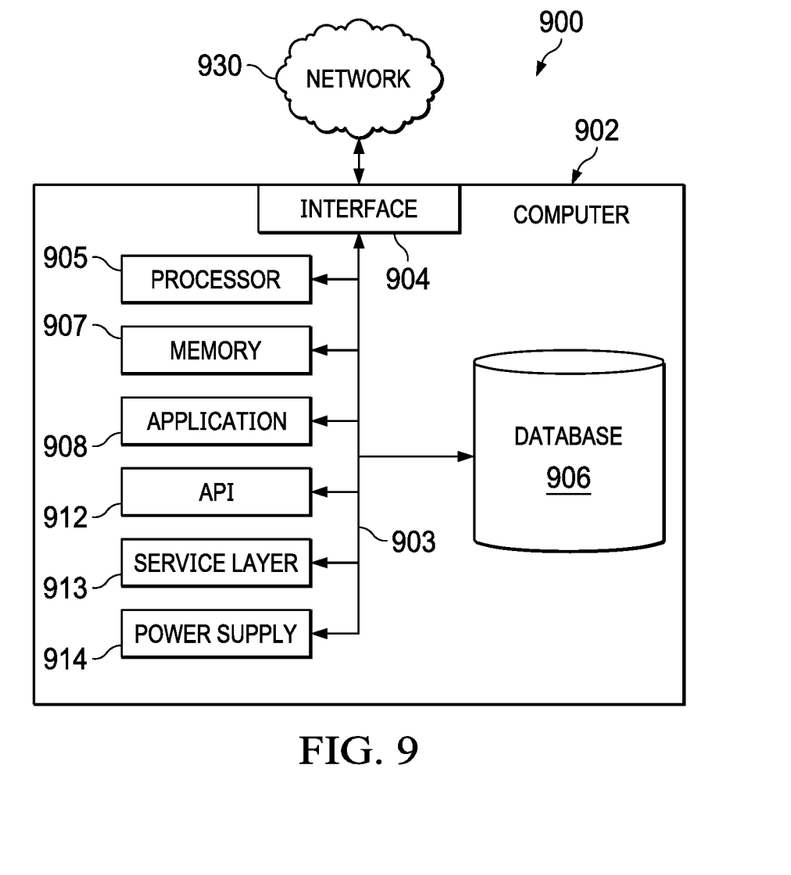
FIG. 9 is a block diagram illustrating an example computer system used to provide computational functionalities associated with described algorithms, methods, functions, processes, flows, and procedures as described in the present disclosure, according to some implementations of the present disclosure.

FIG. 9 is a block diagram of an example computer system 900 used to provide computational functionalities associated with described algorithms, methods, functions, processes, flows, and procedures described in the present disclosure, according to some implementations of the present disclosure. The illustrated computer 902 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 902 can include input devices such as keypads, keyboards, and touch screens that can accept user information. Also, the computer 902 can include output devices that can convey information associated with the operation of the computer 902. The information can include digital data, visual data, audio information, or a combination of information. The information can be presented in a graphical user interface (UI) (or GUI).

The computer 902 can serve in a role as a client, a network component, a server, a database, a persistency, or components of a computer system for performing the subject matter described in the present disclosure. The illustrated computer 902 is communicably coupled with a network 930. In some implementations, one or more components of the computer 902 can be configured to operate within different environments, including cloud-computing-based environments, local environments, global environments, and combinations of environments.

At a high level, the computer 902 is an electronic computing device operable to receive, transmit, process, store, and manage data and information associated with the described subject matter. According to some implementations, the computer 902 can also include, or be communicably coupled with, an application server, an email server, a web server, a caching server, a streaming data server, or a combination of servers.

The computer 902 can receive requests over network 930 from a client application (for example, executing on another computer 902). The computer 902 can respond to the received requests by processing the received requests using software applications. Requests can also be sent to the computer 902 from internal users (for example, from a command console), external (or third) parties, automated applications, entities, individuals, systems, and computers.

Each of the components of the computer 902 can communicate using a system bus 903. In some implementations, any or all of the components of the computer 902, including hardware or software components, can interface with each other or the interface 904 (or a combination of both), over the system bus 903. Interfaces can use an application programming interface (API) 912, a service layer 913, or a combination of the API 912 and service layer 913. The API 912 can include specifications for routines, data structures, and object classes. The API 912 can be either computer-language independent or dependent. The API 912 can refer to a complete interface, a single function, or a set of APIs.

The service layer 913 can provide software services to the computer 902 and other components (whether illustrated or not) that are communicably coupled to the computer 902. The functionality of the computer 902 can be accessible for all service consumers using this service layer. Software services, such as those provided by the service layer 913, can provide reusable, defined functionalities through a defined interface. For example, the interface can be software written in JAVA, C++, or a language providing data in extensible markup language (XML) format. While illustrated as an integrated component of the computer 902, in alternative implementations, the API 912 or the service layer 913 can be stand-alone components in relation to other components of the computer 902 and other components communicably coupled to the computer 902. Moreover, any or all parts of the API 912 or the service layer 913 can be implemented as child or sub-modules of another software module, enterprise application, or hardware module without departing from the scope of the present disclosure.

The computer 902 includes an interface 904. Although illustrated as a single interface 904 in FIG. 9, two or more interfaces 904 can be used according to particular needs, desires, or particular implementations of the computer 902 and the described functionality. The interface 904 can be used by the computer 902 for communicating with other systems that are connected to the network 930 (whether illustrated or not) in a distributed environment. Generally, the interface 904 can include, or be implemented using, logic encoded in software or hardware (or a combination of software and hardware) operable to communicate with the network 930. More specifically, the interface 904 can include software supporting one or more communication protocols associated with communications. As such, the network 930 or the interface's hardware can be operable to communicate physical signals within and outside of the illustrated computer 902.

The computer 902 includes a processor 905. Although illustrated as a single processor 905 in FIG. 9, two or more processors 905 can be used according to particular needs, desires, or particular implementations of the computer 902 and the described functionality. Generally, the processor 905 can execute instructions and can manipulate data to perform the operations of the computer 902, including operations using algorithms, methods, functions, processes, flows, and procedures as described in the present disclosure.

The computer 902 also includes a database 906 that can hold data for the computer 902 and other components connected to the network 930 (whether illustrated or not). For example, database 906 can be an in-memory, conventional, or a database storing data consistent with the present disclosure. In some implementations, database 906 can be a combination of two or more different database types (for example, hybrid in-memory and conventional databases) according to particular needs, desires, or particular implementations of the computer 902 and the described functionality. Although illustrated as a single database 906 in FIG. 9, two or more databases (of the same, different, or combination of types) can be used according to particular needs, desires, or particular implementations of the computer 902 and the described functionality. While database 906 is illustrated as an internal component of the computer 902, in alternative implementations, database 906 can be external to the computer 902.

The computer 902 also includes a memory 907 that can hold data for the computer 902 or a combination of components connected to the network 930 (whether illustrated or not). Memory 907 can store any data consistent with the present disclosure. In some implementations, memory 907 can be a combination of two or more different types of memory (for example, a combination of semiconductor and magnetic storage) according to particular needs, desires, or particular implementations of the computer 902 and the described functionality. Although illustrated as a single memory 907 in FIG. 9, two or more memories 907 (of the same, different, or combination of types) can be used according to particular needs, desires, or particular implementations of the computer 902 and the described functionality. While memory 907 is illustrated as an internal component of the computer 902, in alternative implementations, memory 907 can be external to the computer 902.

The application 908 can be an algorithmic software engine providing functionality according to particular needs, desires, or particular implementations of the computer 902 and the described functionality. For example, application 908 can serve as one or more components, modules, or applications. Further, although illustrated as a single application 908, the application 908 can be implemented as multiple applications 908 on the computer 902. In addition, although illustrated as internal to the computer 902, in alternative implementations, the application 908 can be external to the computer 902.

The computer 902 can also include a power supply 914. The power supply 914 can include a rechargeable or non-rechargeable battery that can be configured to be either user- or non-user-replaceable. In some implementations, the power supply 914 can include power-conversion and management circuits, including recharging, standby, and power management functionalities. In some implementations, the power-supply 914 can include a power plug to allow the computer 902 to be plugged into a wall socket or a power source to, for example, power the computer 902 or recharge a rechargeable battery.

There can be any number of computers 902 associated with, or external to, a computer system containing computer 902, with each computer 902 communicating over network 930. Further, the terms "client," "user," and other appropriate terminology can be used interchangeably, as appropriate, without departing from the scope of the present disclosure. Moreover, the present disclosure contemplates that many users can use one computer 902 and one user can use multiple computers 902.

Described implementations of the subject matter can include one or more features, alone or in combination.

For example, in a first implementation, a computer-implemented method includes: generating optical pulses; introducing the optical pulses into a single mode fiber (SMF); transmitting the optical pulses from the SMF into an MMF through a connection between the SMF and MMF in which a central axis of the SMF is aligned with a central axis of the MMF such that that the fundamental mode is excited within the MMF; separating a Rayleigh signal, a Stokes Raman signal, and an Anti-Stokes Raman signal from backscatter produced by the optical pulses along a length of the MMF; obtaining temperature measurements along the length of the MMF using the Stokes Raman signal and the Anti-Stokes Raman signal; passing the separated Rayleigh signal from the MMF to the SMF through the connection between the SMF and the MMF such that the separated Rayleigh signal is in the fundamental mode within the SMF; and obtaining vibration measurements along the length of the MMF using the Rayleigh signal transmitted by the SMF.

The foregoing and other described implementations can each, optionally, include one or more of the following features:

A first feature, combinable with any of the following features, the method wherein generating optical pulses includes generating continuous wave laser light and modulating the continuous wave laser light to form the optical pulses.

A second feature, combinable with any of the previous or following features, wherein the connection comprises a fusion splice.

A third feature, combinable with any of the previous or following features, wherein the connection comprises a mating sleeve.

A fourth feature, combinable with any of the previous or following features, wherein obtaining temperature measurements along the length of the MMF using the Stokes Raman signal and an Anti-Stokes Raman signal comprises utilizing a distributed temperature sensor (DTS) to obtain temperature measurements along the length of the MMF using the Stokes Raman signal and the Anti-Stokes Raman signal.

A fifth feature, combinable with any of the previous features, wherein obtaining vibration measurements along the length of the MMF using the Rayleigh signal transmitted by the SMF comprises utilizing a distributed acoustic sensor (DAS) to obtain vibration measurement along the length of the MMF using the Rayleigh signal transmitted by the SMF.

In a second implementation, a non-transitory, computer-readable medium storing one or more instructions executable by a computer system to perform operations including: generating optical pulses; introducing the optical pulses into a single mode fiber (SMF); transmitting the optical pulses from the SMF into an MMF through a connection between the SMF and MMF in which a central axis of the SMF is aligned with a central axis of the MMF such that that the fundamental mode is excited within the MMF; separating a Rayleigh signal, a Stokes Raman signal, and an Anti-Stokes Raman signal from backscatter produced by the optical pulses along a length of the MMF; obtaining temperature measurements along the length of the MMF using the Stokes Raman signal and the Anti-Stokes Raman signal; passing the separated Rayleigh signal from the MMF to the SMF through the connection between the SMF and the MMF such that the separated Rayleigh signal is in the fundamental mode within the SMF; and obtaining vibration measurements along the length of the MMF using the Rayleigh signal transmitted by the SMF.

The foregoing and other described implementations can each, optionally, include one or more of the following features:

A first feature, combinable with any of the following features, wherein generating optical pulses includes generating continuous wave laser light and modulating the continuous wave laser light to form the optical pulses.

A second feature, combinable with any of the previous or following features, wherein the connection comprises a fusion splice.

A third feature, combinable with any of the previous or following features, wherein the connection comprises a mating sleeve.

A fourth feature, combinable with any of the previous or following features, wherein obtaining temperature measurements along the length of the MMF using the Stokes Raman signal and an Anti-Stokes Raman signal comprises utilizing a distributed temperature sensor (DTS) to obtain temperature measurements along the length of the MMF using the Stokes Raman signal and the Anti-Stokes Raman signal.

A fifth feature, combinable with any of the previous features, wherein obtaining vibration measurements along the length of the MMF using the Rayleigh signal transmitted by the SMF comprises utilizing a distributed acoustic sensor (DAS) to obtain vibration measurement along the length of the MMF using the Rayleigh signal transmitted by the SMF.

In a third implementation, a computer-implemented system includes one or more processors and a non-transitory computer-readable storage medium coupled to the one or more processors and storing programming instructions for execution by the one or more processors, the programming instructions instructing the one or more processors to: generate optical pulses; introduce the optical pulses into a single mode fiber (SMF); transmit the optical pulses from the SMF into an MMF through a connection between the SMF and MMF in which a central axis of the SMF is aligned with a central axis of the MMF such that that the fundamental mode is excited within the MMF; separate a Rayleigh signal, a Stokes Raman signal, and an Anti-Stokes Raman signal from backscatter produced by the optical pulses along a length of the MMF; obtain temperature measurements along the length of the MMF using the Stokes Raman signal and the Anti-Stokes Raman signal; pass the separated Rayleigh signal through the connection between the SMF and the MMF such that the separated Rayleigh signal is in the fundamental mode within the SMF; and obtain vibration measurements along the length of the MMF using the Rayleigh signal transmitted by the SMF.

The foregoing and other described implementations can each, optionally, include one or more of the following features:

A first feature, combinable with any of the following features, wherein the programming instructions to instruct the one or more processor to generate optical pulses include programming instruction to instruct the one or more processors to: generate continuous wave laser light and modulate the continuous wave laser light to form the optical pulses.

A second feature, combinable with any of the previous or following features, wherein the connection includes a fusion splice.

A third feature, combinable with any of the previous or following features, wherein the connection includes a mating sleeve.

A fourth feature, combinable with any of the previous or following features, wherein the programming instructions to instruct the one or more processor to obtain temperature measurements along the length of the MMF using the Stokes Raman signal and the Anti-Stokes Raman signal include programming instructions to instruct the one or more processors to utilize a distributed temperature sensor (DTS) to obtain temperature measurements along the length of the MMF using the Stokes Raman signal and the Anti-Stokes Raman signal.

A fifth feature, combinable with any of the previous or following features, wherein the programming instructions to instruct the one or more processor to obtain vibration measurements along the length of the MMF using the Rayleigh signal transmitted by the SMF include programming instructions to instruct the one or more processors to utilizing a distributed acoustic sensor (DAS) to obtain vibration measurement along the length of the MMF using the Rayleigh signal transmitted by the SMF.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as standalone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/nonvolatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/–R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback.

Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

A number of implementations of the present disclosure have been described. Nevertheless, it will be understood that various modifications may be made without departing from the spirit and scope of the present disclosure. For example, in some implementations, an amplifier may be used to enhance a transmitted optical signal. Accordingly, other embodiments are within the scope of the following claims.

What is claimed is:

1. A sensor for simultaneous distributed sensing of vibration and temperature using a multimode optical fiber (MMF), the sensor comprising:
    a laser source operable to generate laser light;
    a modulator operable to generate optical pulses from the laser light;
    a single mode optical fiber (SMF) operable to transmits the optical pulses;
    an MMF extending from the SMF;
    a connection formed between the SMF and the MMF in which a central axis of the SMF is aligned with a central axis of the MMF such that optical pulses transmitted from the SMF to the MMF excite the fundamental mode within the MMF;
    wherein the connection comprises a mating sleeve;
    a filter operable to separate a Rayleigh signal, a Stokes Raman signal, and an Anti-Stokes Raman signal from backscatter generated along a length of the MMF;
    a distributed temperature sensor (DTS) operable to detect distributed temperatures along the length of the MMF using the Stokes Raman signal and the Anti-Stokes Raman signal; and
    a distributed acoustic sensor (DAS) operable to detect distributed vibrations along the length of the MMF using the Rayleigh signal.

2. The sensor of claim 1, wherein the connection comprises a fusion splice.

3. The sensor of claim 1, wherein the filter is a wavelength-division-multiplexing (WDM) filter.

4. The sensor of claim 1, wherein the generated laser light is a continuous wave laser light.

5. The sensor of claim 1, wherein the DAS is coupled to the SMF, and wherein the Rayleigh signal is transmitted from the MMF to the SMF through the connection and to the DAS from the SMF.

6. The sensor of claim 1, wherein the DTS comprises:
    a first photodetector (PD) adapted to generate a first analog electrical signal from the Stokes Raman signal;
    a first analog-to-digital converter (ADC) adapted to generate a first digital signal from the first analog electrical signal;
    a second PD adapted to generate a second analog electrical signal from the Anti-Stokes Raman signal;
    a second ADC adapted to generate a second digital signal from the second analog electrical signal; and
    a digital signal processor (DAS) that determines temperature measurements sensed along the length of the MMF using the first digital signal and the second digital signal.

7. The sensor of claim 1, wherein the DAS comprises:
    a photodetector (PD) adapted to generate an analog electrical signal from the Rayleigh signal;
    an analog-to-digital converter (ADC) adapted to generate a digital signal from the analog electrical signal; and
    a digital signal processor (DSP) that determines vibration measurements sensed along the length of the MMF using the digital signal.

8. A computer-implemented method performed by one or more processors for simultaneous distributed temperature and vibration sensing using a multimode optical fiber (MMF), the method comprising the following operations:
    generating optical pulses;
    introducing the optical pulses into a single mode fiber (SMF);
    transmitting the optical pulses from the SMF into an MMF through a connection between the SMF and MMF in which a central axis of the SMF is aligned with a central axis of the MMF such that that the fundamental mode is excited within the MMF;
    wherein the connection comprises a mating sleeve;
    separating a Rayleigh signal, a Stokes Raman signal, and an Anti-Stokes Raman signal from backscatter produced by the optical pulses along a length of the MMF;
    obtaining temperature measurements along the length of the MMF using the Stokes Raman signal and the Anti-Stokes Raman signal;
    passing the separated Rayleigh signal from the MMF to the SMF through the connection between the SMF and the MMF such that the separated Rayleigh signal is in the fundamental mode within the SMF; and obtaining vibration measurements along the length of the MMF using the Rayleigh signal transmitted by the SMF.

9. The computer-implemented method of claim 8, wherein generating optical pulses comprises:
   generating continuous wave laser light; and
   modulating the continuous wave laser light to form the optical pulses.

10. The computer implemented method of claim 8, wherein the connection comprises a fusion splice.

11. The computer implemented method of claim 8, wherein obtaining temperature measurements along the length of the MMF using the Stokes Raman signal and an Anti-Stokes Raman signal comprises utilizing a distributed temperature sensor (DTS) to obtain temperature measurements along the length of the MMF using the Stokes Raman signal and the Anti-Stokes Raman signal.

12. The computer implemented method of claim 8, wherein obtaining vibration measurements along the length of the MMF using the Rayleigh signal transmitted by the SMF comprises utilizing a distributed acoustic sensor (DAS) to obtain vibration measurement along the length of the MMF using the Rayleigh signal transmitted by the SMF.

13. An apparatus for simultaneous distributed temperature and vibration sensing using a multimode optical fiber (MMF), the apparatus comprising:
   one or more processors; and
   a non-transitory computer-readable storage medium coupled to the one or more processors and storing programming instructions for execution by the one or more processors, the programming instructions instruct the one or more processors to:
   generate optical pulses;
   introduce the optical pulses into a single mode fiber (SMF);
   transmit the optical pulses from the SMF into an MMF through a connection between the SMF and MMF in which a central axis of the SMF is aligned with a central axis of the MMF such that that the fundamental mode is excited within the MMF;
   wherein the connection comprises a mating sleeve;
   separate a Rayleigh signal, a Stokes Raman signal, and an Anti-Stokes Raman signal from backscatter produced by the optical pulses along a length of the MMF;
   obtain temperature measurements along the length of the MMF using the Stokes Raman signal and the Anti-Stokes Raman signal;
   pass the separated Rayleigh signal through the connection between the SMF and the MMF such that the separated Rayleigh signal is in the fundamental mode within the SMF; and
   obtain vibration measurements along the length of the MMF using the Rayleigh signal transmitted by the SMF.

14. The apparatus of claim 13, wherein the programming instructions to instruct the one or more processor to generate optical pulses comprise programming instruction to instruct the one or more processors to:
   generate continuous wave laser light; and
   modulate the continuous wave laser light to form the optical pulses.

15. The apparatus of claim 13, wherein the connection comprises a fusion splice.

16. The apparatus of claim 13, wherein the programming instructions to instruct the one or more processor to obtain temperature measurements along the length of the MMF using the Stokes Raman signal and the Anti-Stokes Raman signal comprise programming instructions to instruct the one or more processors to utilize a distributed temperature sensor (DTS) to obtain temperature measurements along the length of the MMF using the Stokes Raman signal and the Anti-Stokes Raman signal.

17. The apparatus of claim 13, wherein the programming instructions to instruct the one or more processor to obtain vibration measurements along the length of the MMF using the Rayleigh signal transmitted by the SMF comprise programming instructions to instruct the one or more processors to utilizing a distributed acoustic sensor (DAS) to obtain vibration measurement along the length of the MMF using the Rayleigh signal transmitted by the SMF.

* * * * *